(12) United States Patent
Leverington

(10) Patent No.: US 10,047,824 B2
(45) Date of Patent: Aug. 14, 2018

(54) METHOD FOR PRE-BALANCING AND MACHINING A CRANKSHAFT BASED ON A MASS DISTRIBUTION METHOD

(71) Applicant: DEERE & COMPANY, Moline, IL (US)

(72) Inventor: James M Leverington, Waterloo, IA (US)

(73) Assignee: Deere & Company, Moline, IL (US)

( * ) Notice: Subject to any disclaimer, the term of this patent is extended or adjusted under 35 U.S.C. 154(b) by 845 days.

(21) Appl. No.: 14/445,590

(22) Filed: Jul. 29, 2014

(65) Prior Publication Data

US 2016/0033006 A1    Feb. 4, 2016

(51) Int. Cl.
| | |
|---|---|
| G05B 15/02 | (2006.01) |
| F16C 3/20 | (2006.01) |
| F16F 15/32 | (2006.01) |
| G01M 1/10 | (2006.01) |
| G01M 1/12 | (2006.01) |
| G01M 1/34 | (2006.01) |
| G01M 1/24 | (2006.01) |

(52) U.S. Cl.
CPC ............ *F16F 15/322* (2013.01); *G01M 1/10* (2013.01); *G01M 1/12* (2013.01); *G01M 1/24* (2013.01); *G01M 1/34* (2013.01); *G05B 15/02* (2013.01); *F16C 3/20* (2013.01)

(58) Field of Classification Search
None
See application file for complete search history.

(56) References Cited

U.S. PATENT DOCUMENTS

| | | | | |
|---|---|---|---|---|
| 3,998,054 | A | * 12/1976 | Whitestone | F01C 1/104 418/186 |
| 4,080,852 | A | *  3/1978 | Heffron | B23B 29/248 82/1.11 |
| 4,180,359 | A | * 12/1979 | Schmid | B23C 3/06 409/197 |
| 4,269,551 | A | *  5/1981 | Kralowetz | B23C 3/06 29/888.08 |
| 4,297,926 | A | * 11/1981 | Russ | B23B 5/18 451/249 |
| 4,300,197 | A | * 11/1981 | Schonfeld | G01M 1/24 700/279 |

(Continued)

FOREIGN PATENT DOCUMENTS

| | | |
|---|---|---|
| CN | 201077006 Y | 6/2008 |
| CN | 202008425 U | 10/2011 |

(Continued)

OTHER PUBLICATIONS

Tellez, H.A. and Rovira, N.L., "Computer Aided Innovation of Crankshafts Using Genetic Algorithms", 2006, Intl Fed. for Information Processing (IFIP), vol. 207, pp. 471-476.*

(Continued)

*Primary Examiner* — Mohammad Ali
*Assistant Examiner* — Kelvin Booker

(57) ABSTRACT

A computer program and method for pre-balancing a crankshaft. The method includes receiving data related to a three dimensional scan of the crankshaft; generating a model based on the data; and providing instructions, based on the model, for defining a pre-balancing machining axis.

10 Claims, 6 Drawing Sheets

(56) References Cited

U.S. PATENT DOCUMENTS

| | | | | |
|---|---|---|---|---|
| 4,326,323 A * | 4/1982 | Kralowetz | ............... | B23C 3/06 29/6.01 |
| 4,337,011 A * | 6/1982 | Schmid | .................... | B23C 3/06 409/199 |
| 4,351,115 A * | 9/1982 | Possati | .................. | G01B 7/287 33/533 |
| 4,446,732 A * | 5/1984 | Schoenfeld | ............ | G01M 1/24 73/461 |
| 4,785,772 A * | 11/1988 | Krotky | ..................... | F16C 3/20 123/192.2 |
| 4,884,210 A * | 11/1989 | Blaimschein | .......... | B23B 49/04 408/2 |
| 5,131,143 A * | 7/1992 | Kirchberger | ............ | B23B 49/04 29/6.01 |
| 5,303,468 A * | 4/1994 | Cieszkiewicz | .......... | B21K 1/08 29/428 |
| 5,435,059 A * | 7/1995 | Chawla | ..................... | F16C 3/20 29/888.08 |
| 5,453,037 A * | 9/1995 | Lehmann | ................. | B23Q 1/76 451/242 |
| 5,625,945 A * | 5/1997 | Paro | .......................... | F16C 3/06 29/888.08 |
| 5,650,684 A * | 7/1997 | Suganuma | .............. | F16F 15/00 310/51 |
| 5,659,493 A * | 8/1997 | Kiridena | ................. | G06T 17/00 700/303 |
| 5,743,230 A * | 4/1998 | Yamazaki | ............... | F01M 1/02 123/192.2 |
| 5,857,388 A * | 1/1999 | Killion | ................... | F16F 15/265 123/192.2 |
| 6,149,502 A * | 11/2000 | Shimomura | .............. | B23B 5/18 451/249 |
| 6,237,442 B1 * | 5/2001 | Killion | ................... | F16F 15/265 123/192.2 |
| 6,397,463 B1 * | 6/2002 | Assie | ....................... | B23B 5/18 29/406 |
| 6,415,847 B1 * | 7/2002 | Baltz | ....................... | B22C 7/005 164/235 |
| 6,470,775 B1 * | 10/2002 | Kohlhase | ................. | B23B 5/18 29/6.01 |
| 6,698,095 B1 * | 3/2004 | Assie | ....................... | B23B 5/18 29/406 |
| 6,765,566 B1 * | 7/2004 | Tsao | .................... | H04N 13/0493 345/419 |
| 6,772,654 B1 * | 8/2004 | Cobble | ..................... | F16C 3/12 123/192.1 |
| 6,999,846 B2 | 2/2006 | Kato et al. | | |
| 9,539,651 B2 * | 1/2017 | Nagata | ..................... | B21K 1/08 |
| 9,610,633 B2 * | 4/2017 | Ohnuma | ................... | B21K 1/08 |
| 9,714,881 B2 * | 7/2017 | Rogalla | .................... | G01M 1/14 |
| 2003/0075136 A1 * | 4/2003 | Inaba | ....................... | F01M 11/02 123/192.2 |
| 2005/0268879 A1 * | 12/2005 | Endoh | ....................... | F16C 3/10 123/197.4 |
| 2006/0027197 A1 * | 2/2006 | Tagami | ................... | F01L 1/022 123/90.17 |
| 2008/0008550 A1 * | 1/2008 | Naumann | ................. | B23C 3/06 29/888.08 |
| 2008/0121203 A1 * | 5/2008 | Reichweger | .......... | F16F 15/264 123/192.2 |
| 2008/0141921 A1 * | 6/2008 | Hinderks | .................. | B63B 1/28 114/274 |
| 2010/0179675 A1 * | 7/2010 | Yoshimoto | .............. | G01M 1/24 700/98 |
| 2011/0071806 A1 * | 3/2011 | Yoshimoto | .............. | F16C 3/08 703/1 |
| 2011/0168125 A1 * | 7/2011 | Momosaki | ............... | F01M 1/02 123/196 R |
| 2011/0203427 A1 * | 8/2011 | Arana Beobide | ......... | B23B 5/18 82/1.11 |
| 2012/0037110 A1 | 2/2012 | Perkins | | |
| 2012/0259452 A1 * | 10/2012 | Yoshimoto | .............. | B23B 49/04 700/186 |
| 2013/0287511 A1 * | 10/2013 | Yoshimoto | .............. | B23B 49/04 408/109 |
| 2014/0102248 A1 * | 4/2014 | Chottiner | ................ | F16F 15/22 74/604 |
| 2014/0109364 A1 * | 4/2014 | Junker | ...................... | B23B 5/18 29/6.01 |
| 2015/0231710 A1 * | 8/2015 | Nagata | .................... | B23B 49/04 408/1 R |
| 2015/0275731 A1 * | 10/2015 | Yasui | ...................... | F01N 3/208 422/105 |
| 2015/0276015 A1 * | 10/2015 | Peterson | .................. | F16C 3/12 74/603 |
| 2015/0306681 A1 * | 10/2015 | Yoshimoto | .............. | B23B 49/04 408/1 R |
| 2015/0346048 A1 * | 12/2015 | Rogalla | ................... | G01M 1/14 73/487 |
| 2016/0018814 A1 * | 1/2016 | Peuchot | .................. | G01M 1/34 700/98 |
| 2016/0033957 A1 * | 2/2016 | Leverington | ...... | G05B 19/4097 700/98 |
| 2016/0315523 A1 * | 10/2016 | Schuttenbach Von | .. | F02B 63/04 |
| 2017/0176181 A1 * | 6/2017 | Machii | ................... | G01B 15/04 |
| 2017/0241919 A1 * | 8/2017 | Machii | ................... | G01N 23/04 |

FOREIGN PATENT DOCUMENTS

| | | |
|---|---|---|
| CN | 202447712 U | 9/2012 |
| EP | 2184595 A1 | 5/2010 |
| EP | 2305420 A1 | 4/2011 |
| JP | 2007264746 A | 10/2007 |

OTHER PUBLICATIONS

Albers, A.; Leon, N.; Aguayo, H. and Meier, T., "Comparison of Strategies for the Optimization/Innovation of Crankshaft Balance", 2007, Intl Fed. for Information Processing (IFIP), vol. 250, pp. 201-210.*

Albers, A.; Leon-Rovira, N.; Aguayo, H. and Maier, T., "Development of an engine crankshaft in a framework of computer-aided innovation", 2009, Computers in Industry, vol. 60, pp. 604-612.*

Angelopoulos, V., "A model-based design approach to redesign a crankshaft for powder metal manufacturing", 2015, Master of Science Thesis, Stockholm, Sweden.*

Choi, K.S. and Pan, J., "Simultations of stress distributions in crankshaft sections under fillet rolling and bending fatigue tests", 2009, Intl. Journal of Fatigue, vol. 31, pp. 544-557.*

Zuquete-Guarato, A.; Mehdi-Souzani, C.; Quinsat, Y.; Lartigue, C. and Sabri, L., "Towars a New Concept of In-Line Crankshaft Balancing by Contact Less Measurement: Process for Selecting the Best Digitizing System", Jul. 2-4, 2012, 11$^{th}$ Biennial Conf. on Engineering Systems and Design Analysis.*

McMahon, C.A. and Xianyi, M., "A Network Approach to Parametric Design Integration", 1996, Research in Engineering Design, vol. 8, pp. 14-32.*

Montazersadgh, F.H. and Fatemi, A., "Optimization of a Forged Steel Crankshaft Subject to Dynamic Loading", 2008, SAE International, Paper 2008-1-0432.*

Zuquete-Guarato, A.; Zuinsat, Y.; Sabri, L.; Mehdi-Souzani, C. and Lartigue, C., Towards a New Concept of In-Line Crankshaft Balancing by Contact Less Measurement: Process for Selecting the Best Digitizing System, Jul. 2-4, 2012, ASME 2012, 11$^{th}$ Biennial Conf on Engineering Systems and Design Analysis.*

Veg, A.; Sinikovic, G.; Andrejevic, R. and Veg, E., "Computer Aided Balancing (CAB) Applied on an Orbiting Mechanism", Jun. 19-25, 2011, 13$^{th}$ World Congress in Mechanism and Machine Science.*

Ruckle, T.W., "Dynamic Balance of a Single Cylinder Reciprocating Engine with Optical Access", 2014, Master of Science Thesis, Mechanical Engineering, Michigan State University.*

Sun, M.Y.; Lu, S.P.; Li, D.Z.; Li, Y.Y.; Lang, X.G. and Wang, S.Q., "Three-dimensional Finite Element Method Simulation and Opti-

(56) References Cited

OTHER PUBLICATIONS mization of Shrink Fitting Process for a Large Marine Crankshaft", Feb. 7, 2010, Materials and Design, 31, 4155-4164.*
Suzuki, T., "Introduction of Product: Introducing Crankshaft Miller Model GPM170E-5", 2007, Komatsu Technical Report, vol. 53, No. 159.*
Jang, J.; Choi, W.C.; Cho, C.R. and Cho, S.J., "Effect of Varying Machining Point on Deformation of Crankshaft Pin in Orbital Grinding System", Aug. 2015, Proceedings of the $32^{nd}$ IIER International Conference, ISBN: 978-93-85465-69-7.*
Chen, S. and Cho, K.-Z., "Numerical Study and Design of the Compressor's Crankshaft", Jul. 11, 2008, 2008 Asia Simulation Conference—$7^{th}$ Intl. Conf. on Sys. Simulation and Scientific Computing.*
European Search Report issued in counterpart application No. 15177123.5, dated Dec. 7, 2015 (9 pages).
European Communication pursuant to Article 94(3) EPC issued in counterpart application No. 15177130.0, dated Jun. 13, 2017 (7 pages).

* cited by examiner

METHOD FOR PRE-BALANCING AND MACHINING A CRANKSHAFT BASED ON A MASS DISTRIBUTION METHOD

FIELD OF THE DISCLOSURE

The present disclosure relates to a program and method for pre-balancing a crankshaft.

BACKGROUND OF THE DISCLOSURE

Reciprocating engines have machined crankshafts that rotate at high speeds, and also have pistons and connecting rods that oscillate up and down with every revolution of the machined crankshaft. These parts are referred to as the engine's rotating assembly. Machined crankshafts need to be highly engineered, so as to maximize the efficiency of the energy conversion process and also to resist shock loading issues and fatigue failure. Further, machined crankshafts need to be light and small, so as to provide fast response times and to be compact enough to fit inside of an engine block.

The magnitude of the force generated by an unbalance in any given rotating part depends on two things: first, the revolutions per minute ("RPM") of the unbalanced rotating engine part, and second, the level of unbalance. The larger and heavier the part and the faster it rotates, the greater the forces generated by any unbalance. With respect to a rotating machined crankshaft, the force at the main bearings is proportional to the speed of the engine squared. And, additionally, the further the weight creating the unbalance is located from the center of gravity, the greater its effect on the rotating part as the rotating assembly spins. Typically, large heavy counterweights are used to offset the forces generated by the reciprocating weight of the pistons and rods. The machined crankshaft must not only maintain its own balance as it rotates inside the block, but it must also offset the forces generated by the mass of the pistons and rods as they pump up and down.

As just one example, crankshafts may be made by a deformation process in which the work is compressed between a pair of dies, using either impact or gradual pressure to form the part. Over time, the dies change and cause latent changes between respective crankshafts. As just one example, when the dies form the crankshaft, there may be a thin web left thereon where the two dies meet. The size of the thin web varies between the crankshafts, as its size is related to how much wear there is on the dies.

A crankshaft may be pre-balanced by spinning it to check for unbalanced conditions. Pre-balancing—or sometimes referred to as rough balancing—is based on a measured unbalanced condition, wherein first and second blind apertures are drilled into both ends of the crankshaft, so as to establish a machining axis for the crankshaft for later broaching, drilling, and grinding processes. However, known manufacturing processes, such as spinning processes, are unable to indicate exactly how the mass of the crankshaft is distributed. In particular, at least some known manufacturing methods are unable to account for the die wear and the associated variations manufactured into each crankshaft (as a result of each crankshaft being unique).

The proper placement of the machining axis may be critical to both pre-balancing the forged crankshaft and also end-balancing the machined crankshaft. In some cases, if the machining axis is improperly placed, then the machining processes may take too much material off of the forged crankshaft in one or more given places. The final, machined crankshaft may still have certain un-machined portions (e.g., the counterweights). The un-machined portions may affect the balance of the final, machined crankshaft and, in some case, so much so that the machined crankshaft cannot be properly balanced and is, thus, scrapped.

SUMMARY OF THE DISCLOSURE

Disclosed is a program and method for pre-balancing a crankshaft. The method includes receiving data related to a three dimensional scan of the crankshaft; generating a model based on the data; and providing instructions, based on the model, for defining a pre-balancing machining axis.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
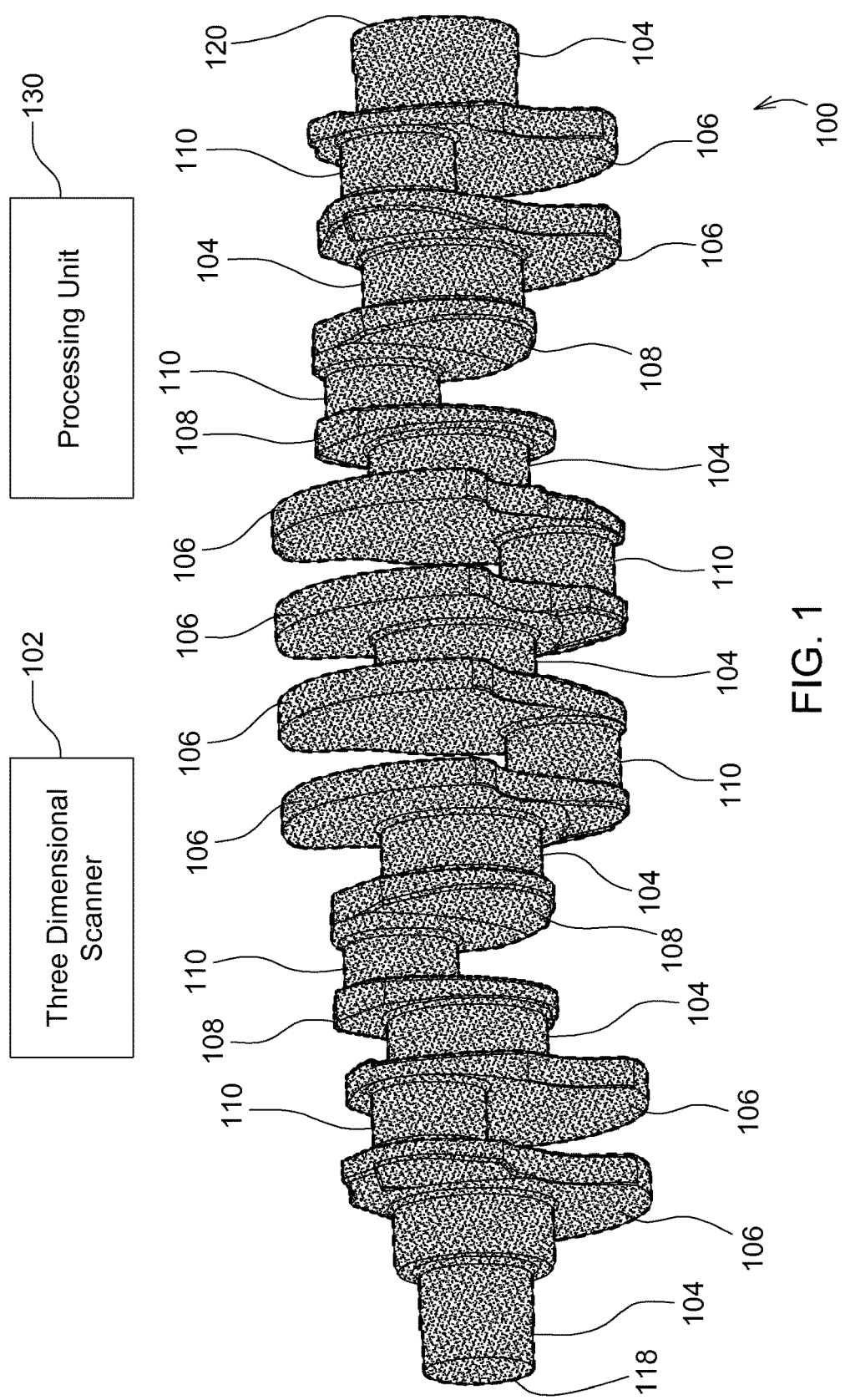
FIG. 1 is a perspective view of an example of a crankshaft.
Figure 2:
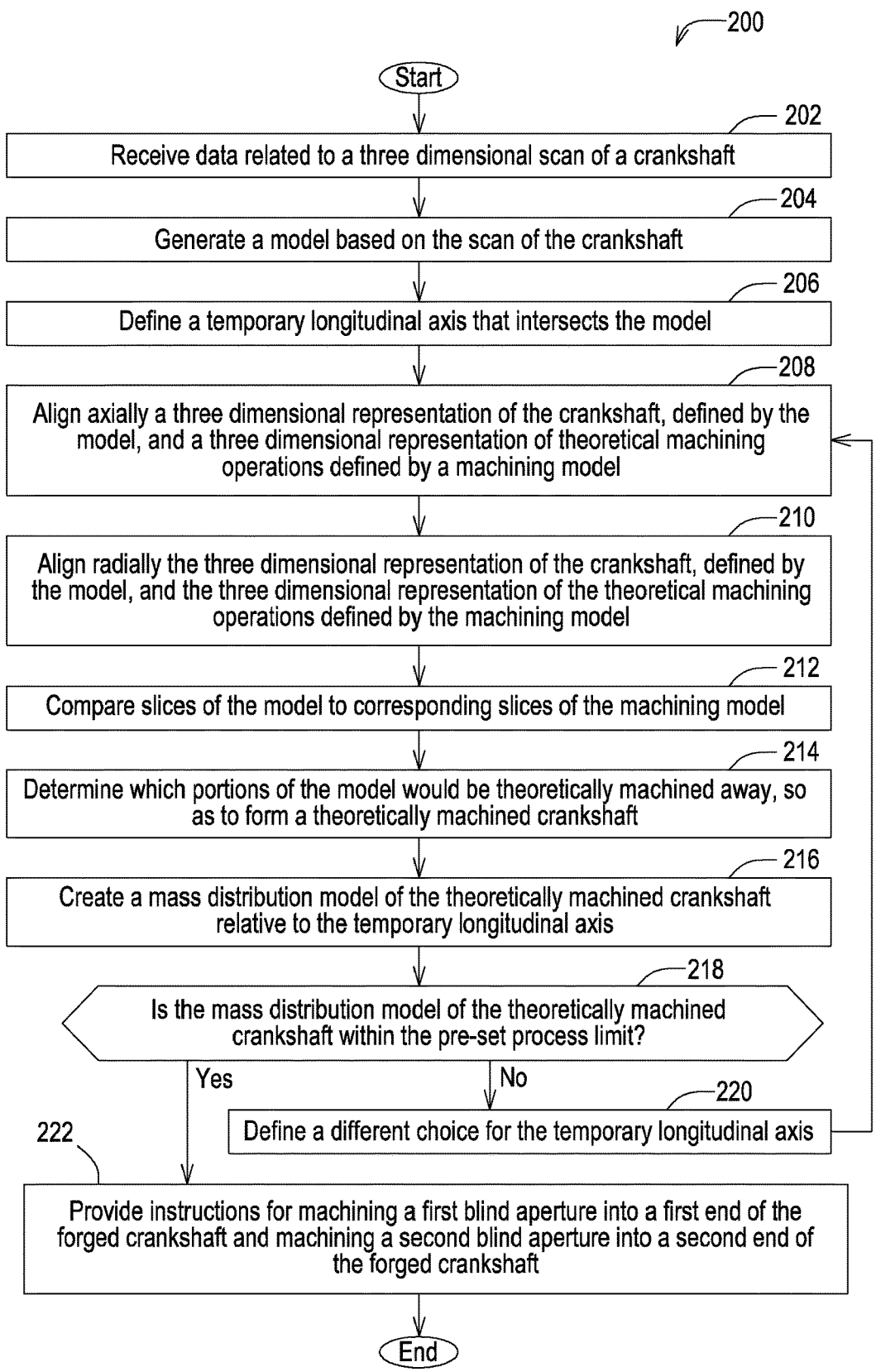
FIG. 2 is an example of a method for pre-balancing the crankshaft.

Shown in FIG. 1 is an embodiment of a crankshaft 100, and shown in FIG. 2 is a method 200 for pre-balancing the crankshaft 100 for use in an internal combustion engine. While the crankshaft 100 is shown as being one for use in a six cylinder internal combustion engine, the method 200 may be used with various sizes and styles of crankshafts. The crankshaft 100 may be used in a variety of machines, including on-highway trucks, construction vehicles, marine vessels, stationary generators, automobiles, agricultural tractors, agricultural vehicles, and recreational vehicles.

The crankshaft 100 includes main journals 104 used as the pivoting links with respect to the crankcase of the engine. Further, the crankshaft 100 includes crankpin journals 110, each of which are shifted in relation to the main journals 104 and each of which link with a connecting rod. Coupled to each connecting rod is a piston for moving in a cylinder. The crankpin journals 110 are positioned between the main journals 104 and shifted therefrom by arms 108, ensuring not only their shifting but also their spacing between the main journals 104 and crankpin journals 110. The arms 108 include counterweights 106 for balancing the unbalance due to the shifting of the mass of the main journals 104 and crankpin journals 110. The crankshaft 100 also has a first end 118 and a second end 120. In FIG. 1, the surfaces of the crankshaft 100 are shown as being rough surfaces, indicative of the crankshaft 100 being un-machined.

Referring further to FIGS. 1-2, at 202, a processing unit 130 receives data related to a three dimensional scan of the crankshaft 100. In an example embodiment, the processing unit 130 is a device that executes sequences of instructions, in the form of a computer program, contained in a memory. Execution of the sequences of instructions causes the processing unit 130 to perform steps such as generating control signals. The instructions may be loaded in a random access memory (RAM) for execution by the processing unit 130 from a read only memory (ROM), a mass storage device, or some other persistent storage. In other embodiments, hard wired circuitry may be used in place of or in combination with software instructions to implement the functions described. For example, the processing unit 130 may be embodied as part of one or more application-specific integrated circuits (ASICs). Unless otherwise specifically noted, the processing unit is not limited to any specific combination of hardware circuitry and software, nor to any particular source for the instructions executed by the processing unit 130.

In an example embodiment, the term "computer program" means any expression, in any language, code or notation, of a set of instructions intended to cause a system having an information processing capability to perform a particular function either directly or after either or both of the following: a) conversion to another language, code or notation; b) reproduction in a different material form. For example, a computer program may include, but is not limited to, a subroutine, a function, a procedure, an object method, an object implementation, an executable application, an applet, a servlet, a source code, an object code, a shared library/dynamic load library and/or other sequence of instructions designed for execution by the processing unit 130.

The three dimensional scan may be taken by a three dimensional scanner 102 that scans the crankshaft 100. The three dimensional scanner 102 may be a device for analyzing an object and for collecting data related to its shape. For example, the three dimensional scanner 102 may create a point cloud of geometric samples on the surface of the objects, so that the points can then be used to extrapolate the shape thereof. The three dimensional scanner 102 may be a non-contact active scanner, a kind that emits some kind of radiation or light and then detects its reflection or radiation passing through the object. As another example, the three dimensional scanner 102 may be a non-contact passive scanner, a kind that does not emit any kind of radiation, but instead relies on detecting reflected ambient radiation. Some scanners of this kind detect visible light, because it is readily available ambient radiation. One example of a non-contact passive scanner is a stereoscopic system, which employs two video cameras spaced apart from one another, so as to look at the same scene from different angles. By analyzing the slight differences between the images, it is possible to determine the distance to each point for reconstructing the object.

Further, at 204, the processing unit 130 generates a model 300 that is based on the scanning of the crankshaft 100. The model 300 may have a plurality of values indicating whether the crankshaft 100 has material present at each of a plurality of specific locations. For example, the model 300 may have a plurality of values indicating the shape defined by an outer shell of the crankshaft 100.

The model 300, because it is based on the crankshaft 100, may include modeled main journals 304, modeled counterweights 306, modeled arms 308, modeled crankpin journals 310, a modeled first end 318, and a model second end 320. By knowing the shape and assuming that the shape is homogenous, the method 200 may be able to calculate where the crankshaft 100 has material present, in contrast to where it does not (e.g., simply an area surrounding the crankshaft 100). The model 300 is shown as being smooth, so as to simplify FIGS. 3-5 and so as to better illustrate other features. However, in some embodiments of the method 200, the model 300 may be precise enough that the roughness of the crankshaft 100 is contained therein.

In at least some embodiments of method 200, the model 300 may be a three dimensional array. In such an embodiment, the three dimensional array may be made of a plurality of ones and zeroes, wherein the ones may represent where material is present and the zeroes may represent where material is not present, for example.

At 206, the processing unit 130 defines a temporary longitudinal axis 314 that intersects the model 300. The defining may include defining a temporary longitudinal axis 314 that initially intersects a geometric center 316 of the crankshaft 100, wherein the geometric center 316 of the crankshaft 100 may be based on, for example, the geometric center 316 of the modeled main journals 304 (as based on the main journals 104).

The model 300 may be compared to a machining model 400. The machining model 400, which may be a three dimensional array, may have a second plurality of values indicating whether a machining operation is performed at each of a second plurality of specific locations. In such an embodiment, the three dimensional array may be made of a plurality of ones and zeroes, wherein the ones may represent where machining operations would be performed and where zeroes may represent where machining operations would not be performed. The machining operations represent where machining operations would take place relative to the crankshaft 100, assuming the machining axis is equivalent to the temporary longitudinal axis 314. The machining model 400 may include main journal machining operations 404 and crankpin journal machining operations 410, to provide just a couple of potential examples. The machining operations may not all overlap the crankshaft 100. This is because the machining operations may, in some embodiments, go through a predetermined, consistent set of passes, whether the crankshaft 100 is present at a given location or not. In such embodiments, for example, the crankshaft 100 may not be present at a given location because of die changes, but the machining operations may remain the same and make passes, even where the crankshaft 100 is not present. In other embodiments, the machining operations may vary, so as to align with the model 300, resulting in fewer machining passes, for example.

Figure 3:
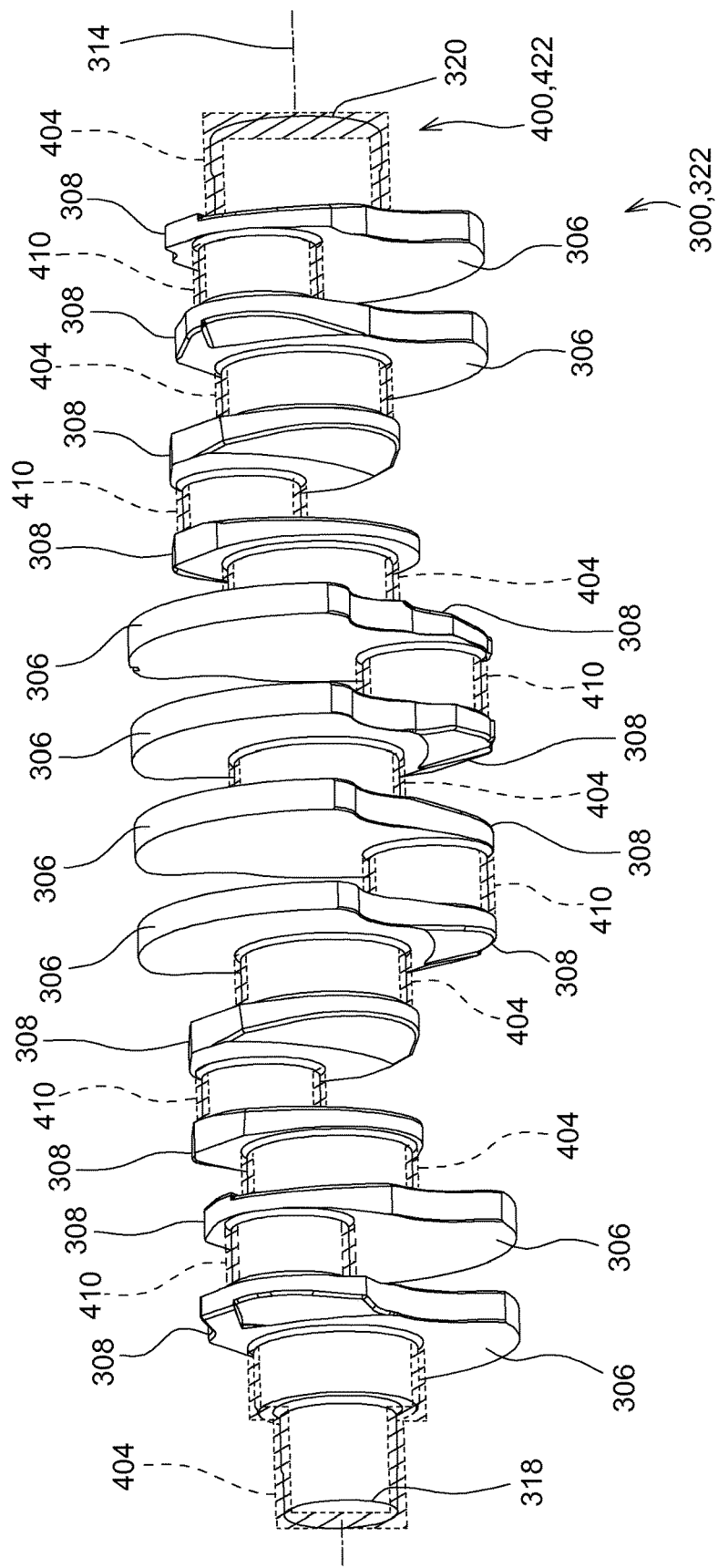
FIG. 3 is a perspective view of an example of a three dimensional representation of the crankshaft defined by a model, and aligned therewith is an example of a three dimensional representation of machining operations defined by a machining model.
Figure 4:
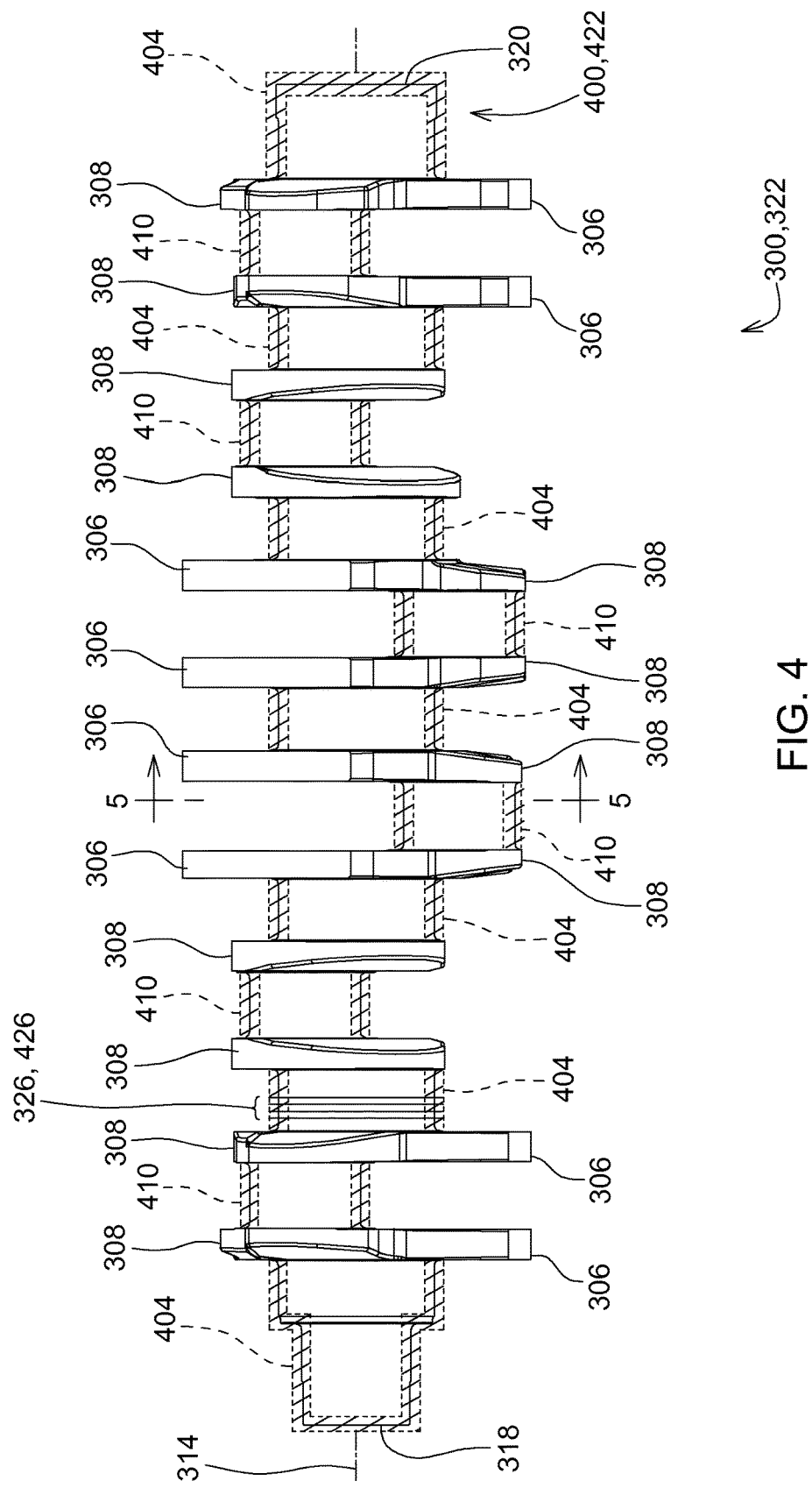
FIG. 4 is an elevational view, illustrating the three dimensional representation of the crankshaft being in axial alignment with the three dimensional representation of the machining operations.

At 210 and as shown in FIGS. 3-4, the processing unit 130 compares the model 300 to the machining model 400, which may include aligning axially a three dimensional representation 322 of the crankshaft 100 defined by the model 300, and a three dimensional representation 422 of the machining operations defined by the machining model 400. In some embodiments of method 200, at 208, the aligning axially may include aligning a portion of the representation 322 of the crankshaft 100 that defines, for example, a face of the crankshaft 100 with a corresponding portion of the representation 422 of the machining operations that defines a machining operation of a face of the crankshaft 100. As another example, in some other embodiments, a section of the three dimensional representation 322 of the crankshaft 100 that defines a pair of faces of the crankshaft 100 may be centered relative to a corresponding section of the representation 422 of the machining operations of the machining model 400 that defines a pair of faces. In either case, the model 300 may be a three dimensional array and the machining model 400 may also be a three dimensional array, both of which could be aligned with one another, so as to align axially what is representative of the crankshaft 100 and what is representative of the machining operation related thereto. The face may be representative of the first end 118 or the second end 120, for example, or one of the various other faces of the crankshaft 100.

Figure 5:
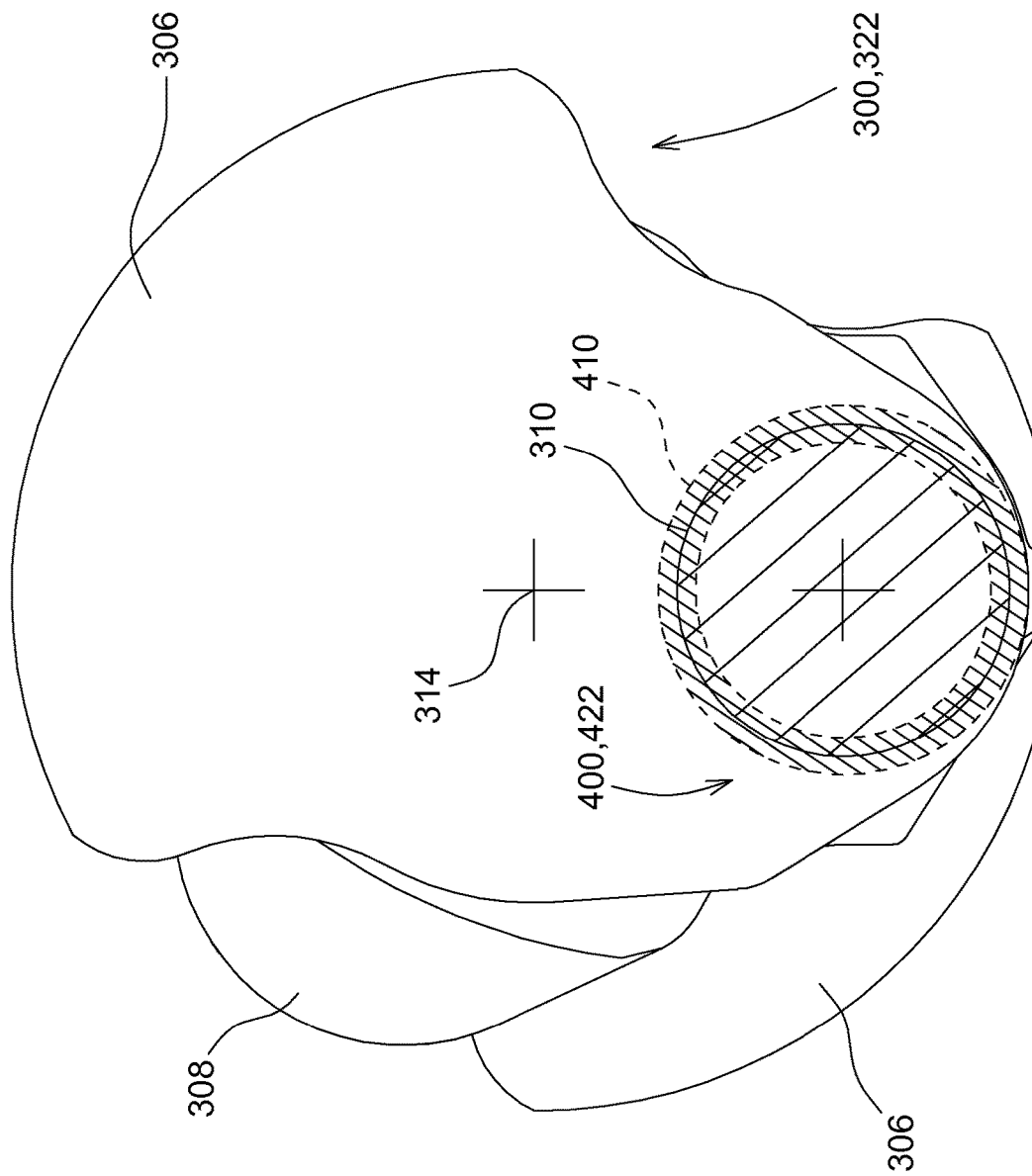
FIG. 5 is a cross section of FIG. 3 taken along lines 5-5, illustrating the three dimensional representation of the crankshaft being in radial alignment with the three dimensional representation of the machining operations.

At 210, the comparing of the model 300 to the machining model 400 may include aligning radially a three dimensional representation 322 of the crankshaft 100, defined by the model 300, and a three dimensional representation 422 of the machining operations defined by the machining model 400 (see FIG. 5). As just one example, at 210, the aligning radially may include aligning a portion of the representation 322 of the crankshaft 100 that represents one or more of the crankpin journals 110 with the corresponding portion(s) of the representation 422 of the machining operation that defines the machining that correlates to the one or more crankpin journals 110.

In some embodiments of method 200, at 210, the aligning radially may include aligning a portion of the representation 322 of the crankshaft 100 that defines, for example, a crankpin journal 110 of the crankshaft 100 with a corresponding portion of the representation 422 of the machining operations. In such an embodiment, the model 300 may be a three dimensional array and the machining model 400 may be a three dimensional array, both of which could be aligned with one another, so as to align radially what is representative of the crankpin journal 110 of the crankshaft 100 and what is representative of the machining operation related thereto. While the face of the crankshaft 100 is used in this illustrative example, other parts of the crankshaft 100 may also be used, using the same general methodology.

At 212, the processing unit 130 may compare slices 326 of the model 300 to corresponding slices 426 of the machining model 400 (only a few illustrative slices 326 and slices 426 are shown in FIG. 4). The slices 326 of the model 300 may be perpendicular to the temporary longitudinal axis 314 and may be representative of cross sections of the crankshaft 100 (e.g., two dimensional arrays). The corresponding slices 426 of the machining model 400 may be perpendicular to the temporary longitudinal axis 314 and may be representative of cross sections of the machining model 400 (e.g., two dimensional arrays).

At 214, the processing unit 130 theoretically machines away portions of the model 300, so as to form a theoretically machined crankshaft. For example, if slices 326 of the model 300 are compared to corresponding slices 426 of the machining model 400, then each slice 326 of the model 300 could be theoretically machined (e.g., theoretically machined so as to remove the overlap between the model 300 and the machining model 400) and the slices of the theoretically machined crankshaft could then be combined so as to form the entire theoretically machined crankshaft.

At 216, the processing unit 130 creates a mass distribution model of the theoretically machined crankshaft relative to the temporary longitudinal axis 314. In some embodiments of the method 200, the creating of 216 may include analyzing the mass distribution model based on theoretically machined slices of the theoretically machined crankshaft. Each slice may be perpendicular to the temporary longitudinal axis 314, and each slice may be representative of a cross section of the theoretically machined crankshaft. The act of analyzing may include finding a center of gravity of each slice of the theoretically machined crankshaft relative to the temporary longitudinal axis 314.

At 218, the processing unit 130 determines whether the mass distribution model of the theoretically machined crankshaft is within a pre-set limit. The pre-set limit may be associated with, for example, an unbalance condition of no more than plus or minus two ounce-inches for the first end 118 and the second end 120, or even plus or minus one (or lower) ounce-inches for the first end 118 and the second end 120. In some cases, it may be possible to set the pre-set limit so low the final balancing operations are unnecessary (e.g., counterweight drilling operations).

If, at 218, the processing unit 130 determines that the mass distribution model is not within the pre-set limit, then the method 200 proceeds to 218, wherein a different temporary longitudinal axis 314 is selected. Exemplarily, the defining of the different choice of the temporary longitudinal axis 314 may include determining where the temporary longitudinal axis 314 may be properly placed based on the act of finding a center of gravity of each slice of the theoretically machined crankshaft. For example, if the mass distribution model indicates that the mass distribution is offset by 3 mm from the temporary longitudinal axis 314 by 110°, then the temporary longitudinal axis 314 may be offset 3 mm away from its previous location at 250°. By iteratively doing this, each temporary longitudinal axis 314 may be more appropriately placed and more likely to be within the bounds of the pre-set limit than the previous temporary longitudinal axis 314.

Figure 6:
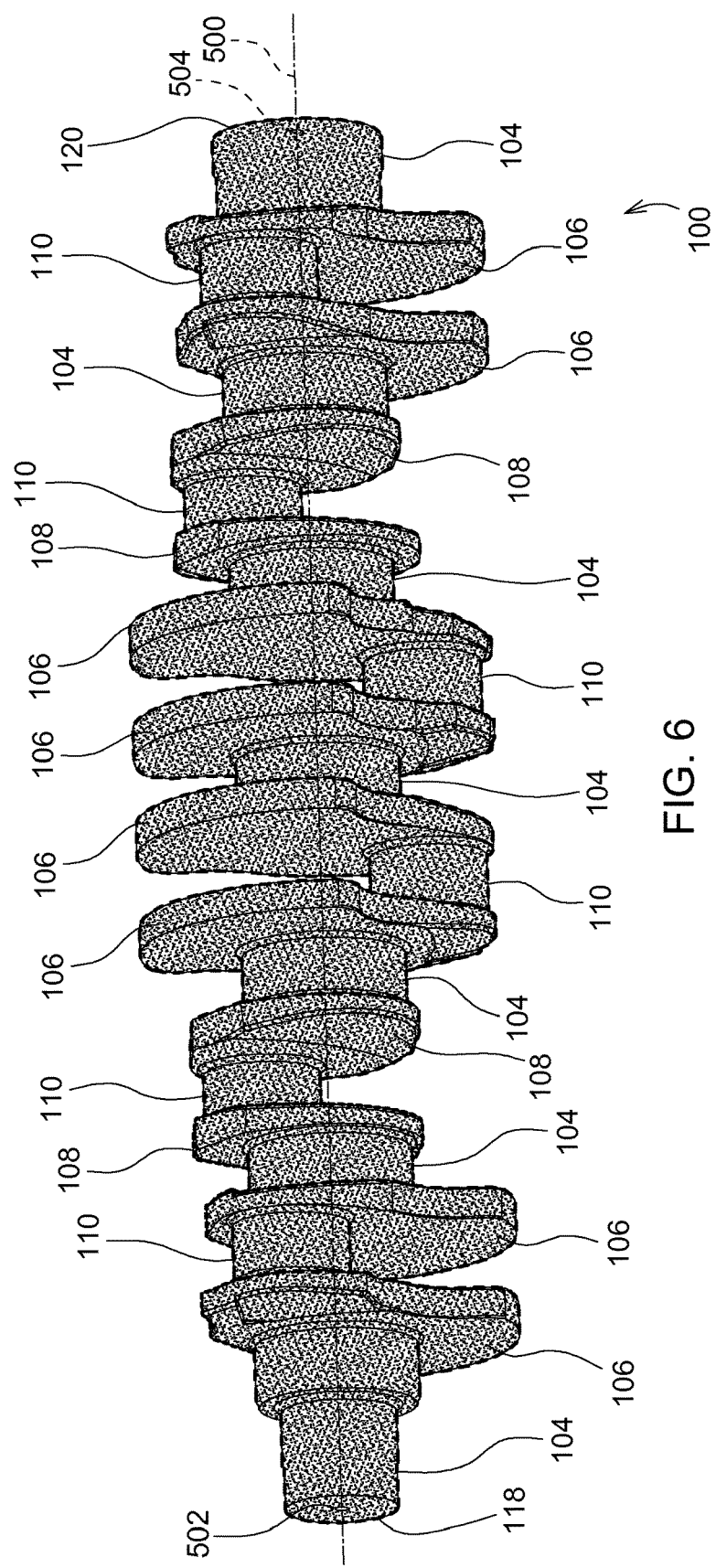
FIG. 6 is a perspective of view of the crankshaft, having a first blind aperture and a second blind aperture machined therein.

If, at 218, the processing unit 130 determines that the mass distribution model is within the pre-set limit, then the method 200 proceeds to 222. At 222, the processing unit 130 provides instructions for defining a pre-balancing machining axis 500 (see FIG. 6). The pre-balancing machining axis 500 may be defined by a first blind aperture 502 that is machined into the first end 118 of the crankshaft 100 and in which a second blind aperture 504 is machined into the second end 120 of the crankshaft 100. The first and second blind apertures 502, 504 are in alignment with the temporary longitudinal axis 314 that was set in the final iteration of the method 200. Then, based on the machining axis 500 being a centerline, the crankshaft 100 may be machined into a machined crankshaft, using machining operations such as broaching, drilling, and grinding.

A technical effect of placing the machining axis 500, by using the method 200, may be that the crankshaft 100 is properly machined and that the machined crankshaft is one that can be both pre-balanced and end-balanced. Otherwise, in some instances, there may be a risk of the machining axis 500 being improperly placed, resulting in the machining processes taking too much material off of the crankshaft 100 in one or more given places. This may be the result of the final, machined crankshaft having certain un-machined portions (e.g., the counterweights 106), which may affect the balance of the final, machined crankshaft. Another technical effect of some embodiments of method 200 is that the un-machined portions are accounted for, thereby avoiding situations where the crankshaft 100 cannot be properly end-balanced and is, thus, scrapped.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method for pre-balancing a crankshaft, the method comprising:
   (a) receiving scanned data related to a three dimensional scan of the crankshaft;
   (b) generating a scanned model based on the scanned data;
   (c) defining a placement of a temporary longitudinal axis that intersects the scanned model;
   (d) identifying which portions of the scanned model would be machined away based on the placement of the temporary longitudinal axis, so as to form a theoretically machined crankshaft, by comparing slices of the scanned model to slices of a machining model;
   (e) creating a mass distribution model of the theoretically machined crankshaft relative to the temporary longitudinal axis;
   (f) determining whether the mass distribution model is within a pre-set limit;
   (g) if the mass distribution model is outside of the pre-set limit, repeating (d)-(f) with different placement choices for the temporary longitudinal axis that intersects the model until the mass distribution model is within the pre-set limit; and
   (h) machining the crankshaft in response to the occurrence of the determination that the mass distribution model is within the pre-set limit.

2. The method of claim 1, further comprising providing instructions for machining a first blind aperture in a first end of the crankshaft and machining a second blind aperture in a second end of the crankshaft, the first and second blind apertures being in alignment with a final temporary longitudinal axis that defines a pre-balancing machining axis.

3. The method of claim 1, wherein the defining comprises defining an initial temporary longitudinal axis that intersects a geometric center of the crankshaft.

4. The method of claim 1, wherein the scanned model has a first plurality of values indicating whether the crankshaft has material present at each of a first plurality of specific locations, the machining model has a second plurality of values indicating whether a machining operation would be performed at each of a second plurality of specific locations.

5. The method of claim 4, wherein the slices are perpendicular to the temporary longitudinal axis, and each slice is representative of a cross section of the theoretically machined crankshaft.

6. The method of claim 5, wherein the analyzing comprises finding a center of gravity of each slice of the theoretically machined crankshaft relative to the temporary longitudinal axis.

7. The method of claim 6, wherein the defining comprises determining where the different choice of the temporary longitudinal axis should be properly placed based on the finding of the center of gravity of each slice of the theoretically machined crankshaft.

8. The method of claim 7, wherein the slices of the scanned model are perpendicular to the temporary longitudinal axis and are representative of cross sections of the crankshaft, corresponding slices of the machining model are perpendicular to the temporary longitudinal axis and are representative of cross sections of the machining model.

9. The method of claim 8, wherein the comparing of the scanned model to the machining model comprises aligning axially a three dimensional representation of the crankshaft defined by the scanned model, and a three dimensional representation of the machining operations defined by the machining model.

10. The method of claim 8, wherein the comparing of the scanned model to the machining model comprises aligning radially a three dimensional representation of the crankshaft defined by the scanned model, and a three dimensional representation of the machining operations defined by the machining model.

* * * * *